Feb. 3, 1925.
P. J. SIMMEN
1,525,008
SYSTEM OF CONTROL FOR MOVING VEHICLES
Filed Aug. 2, 1913    2 Sheets-Sheet 1
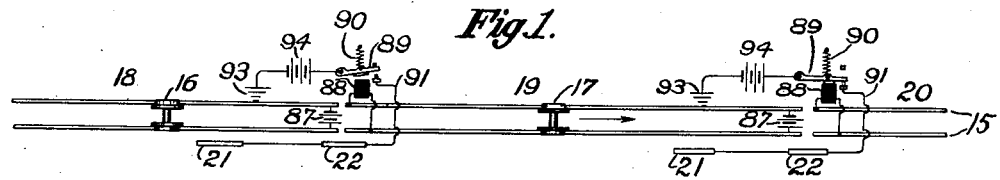
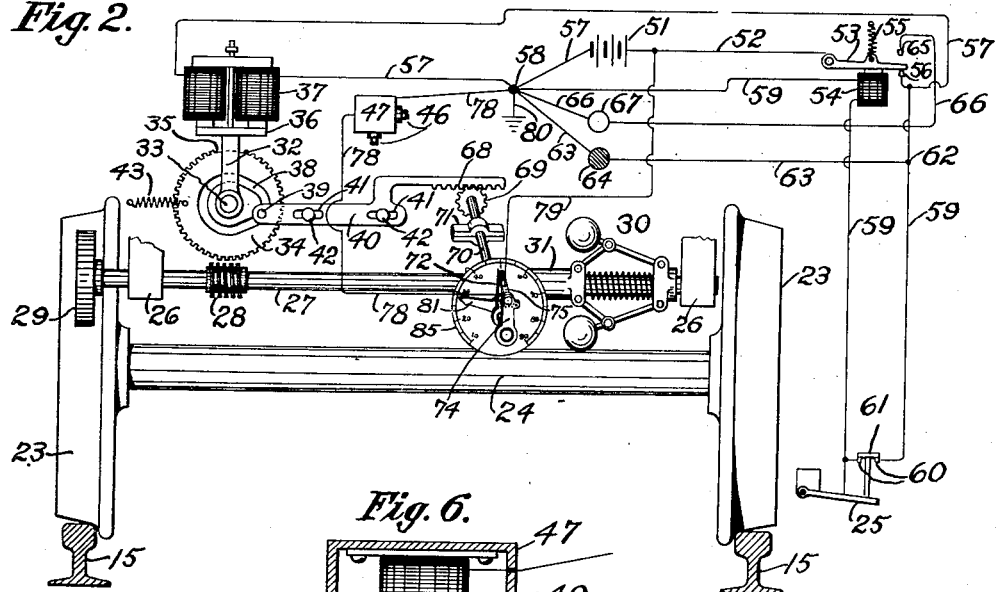

Feb. 3, 1925.                                                    1,525,008
P. J. SIMMEN
SYSTEM OF CONTROL FOR MOVING VEHICLES
Filed Aug. 2, 1913                 2 Sheets-Sheet 2
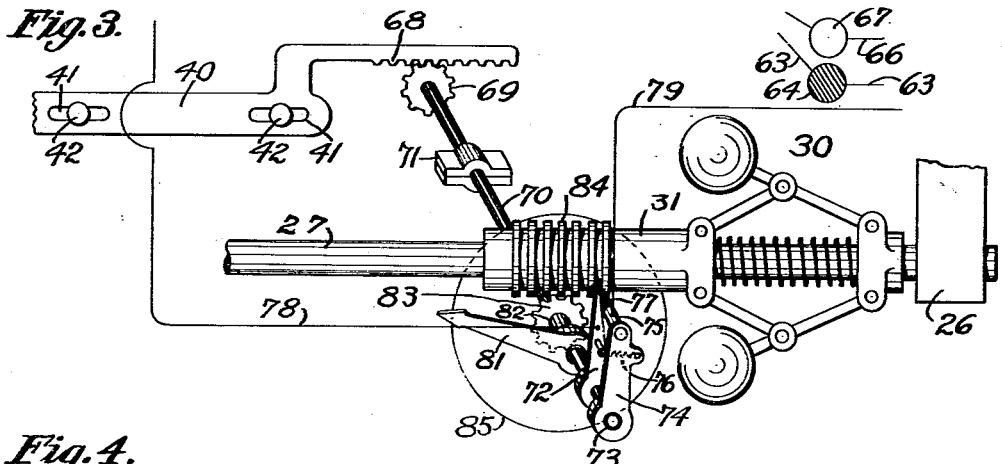
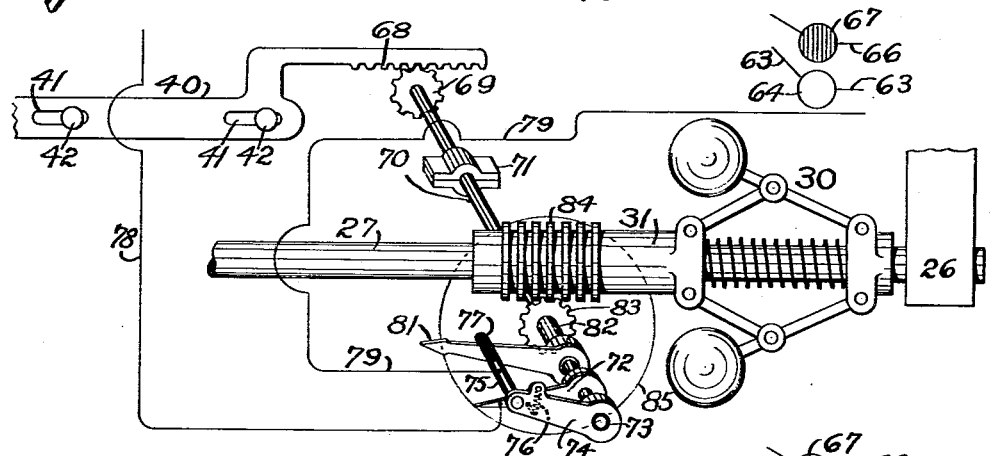
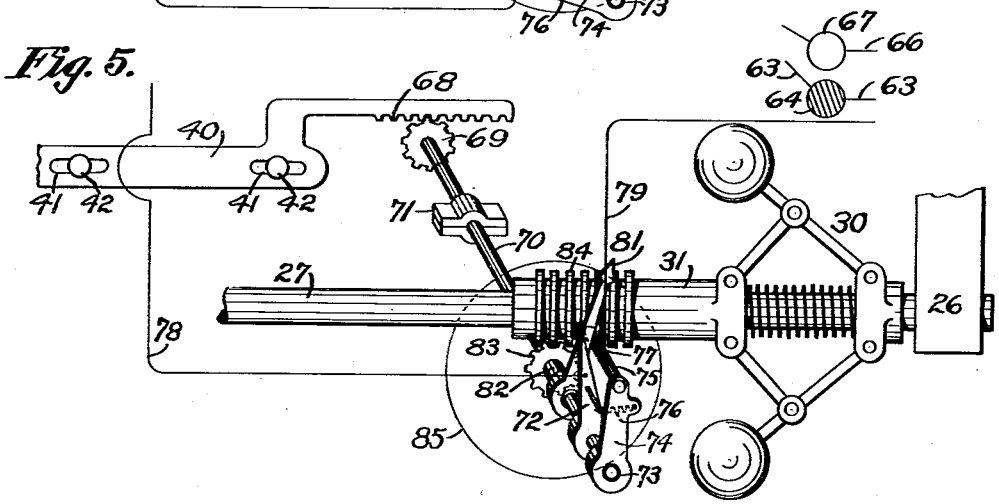

Patented Feb. 3, 1925.

1,525,008

UNITED STATES PATENT OFFICE.

PAUL J. SIMMEN, OF INDIANAPOLIS, INDIANA.

SYSTEM OF CONTROL FOR MOVING VEHICLES.

Application filed August 2, 1913. Serial No. 782,692.

*To all whom it may concern:*

Be it known that I, PAUL J. SIMMEN, a citizen of the United States, residing at Indianapolis, in the county of Marion and State of Indiana, have invented certain new and useful Improvements in Systems of Control for Moving Vehicles, of which the following is a specification.

This invention relates to a system of control for moving vehicles, partly automatic and partly under the supervision of a central operator. It is distinguished from prior systems of this general character in that the operator on a vehicle is automatically warned by a signal on the vehicle that he is within a danger zone and is given an opportunity to reduce the speed of the vehicle under service conditions. At the same time that he is so warned, there is automatically set in operation a device which thereafter and so long as the danger persists indicates a safe speed for the vehicle. If he heeds the warning and reduces such speed below the permissive rate indicated, nothing occurs, but if he does not heed the warning and exceeds the permissive rate, the brakes on the vehicle are automatically operated and the vehicle is retarded and finally brought to a stop. As soon as the danger has passed, there is a clear signal made to the operator on the vehicle, the permissive speed indicator is automatically returned to its maximum position and the vehicle can proceed at any rate below the maximum.

The merit of the invention is that the vehicle is not stopped automatically until after the operator has had an opportunity to reduce his speed to a safe rate and failed to do so; therefore, except in cases where the engineer deliberately disobeys the warning, or is incapacitated from so doing, the vehicle is slowed down or stopped under service conditions and not under emergency conditions.

The present invention is in the nature of an improvement or modification of the structure disclosed and covered by generic claims in Patent 1,150,309, dated August 17, 1915.

In the drawings:—

Figure 1 is a diagram in plan, illustrating the equipment of the trackway.

Figure 2 is a diagram, illustrating an embodiment of the invention applied to a vehicle, and showing the relation of the parts under safety conditions.

Figure 3 is a diagrammatic view, showing the relation of the permissive speed indicator and the actual speed indicator when the clear signal is displayed on the vehicle.

Figure 4 is a view showing such relation after the danger signal is displayed on the vehicle and the permissive speed indicator is actuated.

Figure 5 is a view showing the relation of the parts when the vehicle is being speeded above a permissive rate.

Figure 6 is a detail of the train pipe air brake release valve.

Figures 7 and 8 are views of the dials and pointers, showing different rates of permissive speed of the vehicle.

Figure 9 is a view of a part of one of the signal rails and a contact shoe.

Similar reference numerals designate corresponding parts in all the figures of the drawings.

In the drawings, there is illustrated a single track of railway, having two rails 15, along which vehicles, indicated at 16 and 17 travel, and said railway is divided into sections 18, 19 and 20, insulated from each other. At suitable points along the way, are signal rails in pairs, one of each pair being a distant rail 21 and the other, a home rail 22.

Each vehicle includes as part of its equipment, wheels 23 that run upon the tracks 15, these wheels being disposed in pairs connected by suitable axles 24. Each vehicle also carries a contact shoe 25 and signals and other equipment, as hereinafter explained.

Mounted in suitable bearings 26, at any convenient place on the vehicle, is a shaft 27, provided with a worm 28. Motion is imparted to this shaft from the movement of the vehicle wheels 23 by any suitable mechanism, as for example, a friction wheel 29 that operates upon the periphery of one of the wheels 23.

Secured to the shaft 27, is an actual speed indicator. This speed indicator includes a centrifugal governor 30 having link connections with a collar 31 that is slidable on the shaft 27. It is obvious that the longitudinal movement of the collar 31 on the shaft 27 is directly proportional to the speed of the vehicle, as communicated through the wheel 29 to said shaft.

Mounted at a place convenient to the actual speed indicator, is another device, which may be termed a permissive speed indicator, and which includes a support 32 carrying a shaft 33, on which is mounted a gear wheel 34, adapted to mesh with the worm 28 on the shaft 27. The teeth of the gear wheel 34 are interrupted at 35, for a purpose which will be subsequently described, and said support 32 is suspended from the armature 36 of an electro-magnet 37. The wheel 34 is provided with a cam groove 38, in which there is loosely fitted a roller pin 39 secured to a reciprocatory bar 40, said being slidably mounted on the vehicle in any suitable manner. For example in the present embodiment, the bar is provided with longitudinal slots 41 that receive supporting pins 42. A spring 43, secured to a fixed portion of the vehicle and to the wheel 34, serves to retract the wheel to normal position after actuation.

The usual train air pipe 46 passes through a box 47 located at a convenient place on the vehicle, and said box contains a valve 48 adapted to open and close the pipe, said valve being operated by a solenoid 49 mounted in the box. The parts are so arranged that when the solenoid 49 is energized, the valve is closed, and when it is deenergized, the valve is opened and the air escapes through a port 50 in the box 47. The brakes are thus set to retard or stop the motion of the vehicle. The construction and mode of operation of an air brake system containing a valve of this character is well understood by those skilled in the art and is believed to need no further explanation.

A source of electrical energy, as for example, a battery 51, is located at any desired or convenient place on the vehicle, and a conductor 52 leads therefrom to a contact member 53 of a relay 54, the contact member being under constant tension of a spring 55. The member 53 is arranged to contact with the terminal 56 of a conductor 57 having three stretches leading to and through the electro-magnet 37, and thence through a binding post 58 back to the battery 51. From the conductor 57, there is led another conductor 59 to two terminals 60, which are normally in circuit with a shoe contact 61, and this conductor 59 is led to the relay coil 54 and thence to the post 58. To the conductor 59, at 62, is electrically connected a conductor 63 leading to and through a safety signal, preferably in the form of a green light 64, and thence to the post 58.

The member 53 is also adapted to contact with another terminal 65 disposed opposite to the terminal 56, and said terminal 65 forms the end of a conductor 66 leading to and through a danger signal, preferably in the form of a red light 67, and thence to the post 58.

In order that the relation between the actual and permissive speed of the vehicle may be conveniently observed by the operator, the following mechanism is preferably employed. The bar 40 of the permissive speed indicator is provided with a rack 68 which is in mesh with a pinion 69 carried by a shaft 70 that is journaled in suitable bearings 71. Rigidly secured to this shaft near its opposite end, is a hand or pointer 72. Loosely mounted on the shaft 70, but insulated therefrom by a bushing 73, is a conductor comprising a radial arm 74 having a laterally projecting rod 75. A spring 76, secured to the arm 74 and to the pointer 72, tends to keep the rod 75 in contact with said pointer. The inner or free end of the rod is made of insulating material, as shown at 77. A conductor 78, leading from the binding post 58, includes the solenoid 49 of the train-pipe controlling valve 48, and is connected to the pointer 72. Another conductor 79 is electrically connected to the rod 75, and to the conductor 52. Thus, when the pointer 72 is in contact with the rod 75 a closed circuit from the battery 51 will be established, which will include the said solenoid 49, and the valve 48 will thereby be held in closed position. The binding post 58 is also provided with a ground connection, illustrated at 80.

As part of the indicating mechanism for the actual speed indicator, there is provided a hand or pointer 81 carried by a sleeve 82 that is loosely journaled on the shaft 70, and this sleeve is furthermore provided with a pinion 83 in mesh with annular teeth 84 formed upon the sleeve 31 of said actual speed indicator. In use the two pointers 72 and 81 are arranged in front of a dial 85 provided with suitable graduations 86.

Between or near the track rails 15 of each section is a battery 87 connected to both rails, and thus in circuit with a relay 88 electrically connected to both rails at the opposite end of the section. Adjacent to this relay 88, is a contact piece 89, normally held by the relay against the tension of a spring 90 in contact with the terminal of a conductor 91 in circuit with the two signal rails 21 and 22, and through the ground indicated at 93, with a battery 94 that is electrically connected to the contact piece 89. Thus when the contact piece 89 is held by the solenoid or relay 88 in its closed position, as shown at the right of Figure 1, a closed circuit will be produced through the contact rails and including the said battery 94.

The operation of the device is as follows:

The parts shown in Figures 2 and 3 represent the condition which exists on the vehicle 17 in track section 19 of Figure 1, when such vehicle, moving in the direction indicated by the arrow, has passed over the energized signal rails 21 and 22, at the beginning of such section and has deenergized them because the current from the battery 87 at the end of the section 19 has been short-circuited through the wheels 23 and axle 24 of the vehicle 17, and the circuit of the battery 94 has been broken by the opening of the contact piece 89.

When the vehicle 17 passed over the energized signal rails 21 and 22, at the entrance of the section 19, the current from these rails passed through the conductor 59, the relay 54 and the binding post 58 to the ground, at 80, thus energizing the relay 54, attracting the contact 53 and closing the circuit through the terminal 56, conductors 59 and 63, green light or safety signal 64, post 58, conductor 57, battery 51, conductor 52 and contact 53, causing the said safety signal or green light to glow. At the same time, another circuit was formed through the terminal 56, conductor 57, electro-magnet 37, conductor 57, battery 51, conductor 52 and contact 53, energizing said magnet 37 and thus lifting the gear wheel 34 out of mesh with the worm 28. As soon as the vehicle 17 passes the signal rails 21 and 22, the contact member 61 drops by gravity because of the drop of the contact shoe 25, and thus completes the circuit through the conductor 59 and terminals 60, so that the circuits which were created by passing over the energized signal rails and the elements which were initially energized from the battery 94, are maintained in energized condition by the local battery 51 after contact with the rails 21 and 22 has ceased. So long therefore as these circuits are maintained, the rod 75 will be in contact with the pointer 72, and a circuit will be completed, including these members, the conductors 78 and 79, the battery 51 and the solenoid 49 in the box 47, keeping the release valve of the air brake system closed. Consequently no matter what the speed of the vehicle may be within usual limits, the pointer 72 and rod 75 will remain in contact with each other, and the operator of the vehicle 17 has a clear green signal and may maintain any usual or predetermined speed.

As already stated, the signal rails 21 and 22, at the beginning of the track section 19 are deenergized, by the presence of the vehicle 17 in such track section. The movement of the vehicle 16 towards the section 19 will cause the shoe 25 of this vehicle to come in contact with the deenergized third rail 21. Such contact lifts the shoe contact 61 from the terminals 60 of the conductor 59, and allows the contact 53 to fly back from contact with the terminal 56 to contact with the terminal 65 under the influence of the spring 55. This establishes a circuit through the conductor 66, the red light or danger signal 67, post 58, conductor 57, battery 51, conductor 52 and contact 53, and the red light or danger signal at once glows, the green light being extinguished, inasmuch as its circuit is now broken. At the same time, and for the same reason, the current ceases to flow through both stretches of the conductor 57, and the electro-magnet 37 is thus deenergized, so that the supporting frame of the wheel 34 drops, its teeth at once becoming engaged with the worm 28 on the shaft 27, the permissive speed indicator is actuated and its bar 40 begins to move toward the left as the pin 39 is caused to travel in that direction by the eccentricity of the cam groove 38. This will of course cause the rack 68 to move in a corresponding direction, and as a result, the pointer 72 and arm 74 will turn towards the left, but their electrical contact will be retained, so that the circuit through the solenoid 49 of the air brake release valve will remain closed. Assuming, however, that the operator of the vehicle does not see or does not heed the warning signal that has been displayed and consequently does not reduce the speed of his vehicle, it will be evident that the pointer 81 will remain in a relatively fixed position, and therefore the insulated end 77 of the rod 75 will soon contact with this pointer 81 and be stopped thereby. The pointer 72, however, continues its movement, and as soon as it separates from the rod 75, the circuit which includes the solenoid 49, will be broken, said solenoid will be deenergized, the valve 48 will open and the brakes be applied. If, however, as soon as the operator sees the danger signal, he begins to reduce the speed of the vehicle, the pointer 81 of the actual speed indicator will begin to turn toward the left and so long as the actual speed of the vehicle is less than the permissive speed, as indicated by the position of the pointer 72, nothing occurs to automatically control the speed of the vehicle. The position and shape of the cam groove 38 is such that when the rod 40 is farthest toward the left as it is when the wheel 34 has completed one-half of the revolution and the mutilated portion of the gear has reached the worm 28, the permissive speed is a safe one, say ten miles an hour, so that if the operator so controls the vehicle that the actual speed does not exceed this permissive speed, the contact between the pointer 72 and rod 75 will not be broken, the brakes will not be set, and the vehicle can continue at that rate under complete control.

The mechanism also provides automatically against an excessive speed when running under ordinary conditions. The relation of the parts when a speed above the maximum allowed is reached is illustrated in Figure 5. It will be evident that the higher the speed obtained, the farther toward the right will the sleeve 31 be moved, and this will effect a corresponding movement of the pointer 81. If therefore this pointer moves so far that it will engage the insulated end 77 of the rod 75 and move said rod out of contact with the pointer 72, the circuit through the solenoid 49 will thus be broken and the brakes applied.

When the vehicle 17 leaves track section 19 and enters track section 20, the deenergization of the magnet 37 on the vehicle 16 is maintained until said vehicle 16 reaches the next signal rail 22. This rail having been again energized by the advance vehicle 17 passing out of track section 19, and permitting the relay 88 to again become energized and cause the contact piece to close the circuit through said signal rail, the circuits, as above described are restored in vehicle 16. Consequently the wheel 34 is lifted out of mesh with the worm 28, the green signal light 64 is again caused to glow, the circuit through the solenoid 49 is again closed by the pointer 72 and rod 75 being in contact, the air valve 48 is closed and the vehicle is allowed to proceed under normal conditions.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A system of control for moving vehicles comprising means on the vehicle adapted to indicate its actual speed, means on the vehicle actuated from the running gear of the vehicle, adapted to indicate its permissive speed, means normally inactive adapted to retard the movement of the vehicle, means adapted to actuate the retarding means when the actual speed indicating means and the permissive speed indicating means are relatively moved beyond a predetermined limit, and a signal for apprising the operator of the actuation of the permissive speed indicator.

2. A system of control for moving vehicles comprising means on the vehicle adapted to indicate its actual speed, means on the vehicle actuated from the running gear of the vehicle, adapted to indicate its permissive speed, means normally inactive adapted to retard the movement of the vehicle, means adapted to actuate the retarding means when the actual speed exceeds the permissive speed, and a warning signal automatically thrown into operation with the actuation of the permissive speed indicator.

3. A system of control for moving vehicles comprising means on the vehicle adapted to indicate its actual speed, means on the vehicle actuated from the running gear of the vehicle, adapted to indicate its permissive speed, means normally inactive adapted to retard the movement of the vehicle, means adapted to actuate the retarding means when the actual speed exceeds the permissive speed and to cease such actuation whenever the actual speed is less than the permissive speed, a warning signal, and means automatically operating with the permissive speed indicator to simultaneously operate the warning signal.

4. A system of control for moving vehicles comprising means on the vehicle adapted to indicate its actual speed, means on the vehicle adapted to indicate its permissive speed, a signal normally inactive, and means adapted to operate the signal when the permissive speed indicating means is actuated.

5. A system for controlling vehicles comprising a warning signal on the vehicle normally inactive, means external to the vehicle for controlling the operation of said signal, and means for indicating a continually diminishing safe speed for the vehicle, said controlling means also constituting means for throwing the indicating means into operation to indicate said speed.

6. A system for controlling vehicles, comprising a warning signal on the vehicle normally inactive, means external to the vehicle for controlling the operation of said signal, means for indicating a continually diminishing safe speed for the vehicle, said controlling means also constituting means for throwing the indicating means into operation to indicate said speed, and means adapted automatically to restore the speed-indicating means to a maximum indication and effecting the change of the signal to an inactive condition.

7. A system for controlling vehicles comprising a warning signal on the vehicle normally inactive, means external to the vehicle for controlling the operation of said signal, means for indicating a continually diminishing safe speed for the vehicle and common means for simultaneously throwing the signal and the indicating means into operation to indicate said speed, in combination with means for automatically stopping the vehicle if the operator fails to heed the signal and maintain a speed at a rate below that of the continually diminishing safe indication.

8. A system of control for moving vehicles, comprising normally inactive means for retarding the movement of the vehicle, a permissive speed indicator, an actual speed indicator, means controlled by relative movements of said indicator to a predetermined position for effecting the operation of the retarding means, a signal, and means for operating the signal substantially simultaneously with the initial relative movement of the indicators toward said predetermined position.

9. In a system of control for moving vehicles, comprising normally inactive means for retarding the movement of the vehicle, a permissive speed indicator, an actual speed indicator, one of the indicators being normally inactive, means for causing the movement of the normally inactive indicator, means controlled by the movement of the inactive indicator to a predetermined relation with respect to the other indicator to cause the operation of the retarding means, a signal, and means for causing the signal to operate when the normally inactive indicator is moved.

10. A system of control for moving vehicles, comprising normally inactive means for retarding the movement of the vehicle, a permissive speed indicator, an actual speed indicator, one of the same being normally inactive, means for causing the movement of the normally inactive indicator, a controlling device for said means, means controlled by the movement of said inactive indicator to a predetermined relation with respect to the other indicator to cause the operation of the retarding means, a signal, and operating means for the signal, said controlling device also constituting a controlling device for the signal-operating means.

11. A system of control for moving vehicles, comprising normally inactive means for retarding the movement of the vehicle, a permissive speed indicator, an actual speed indicator, one of the indicators being normally inactive, electrical means for controlling the movement of the normally inactive indicator, a circuit controlling device for said means, means controlled by the movement of said normally inactive indicator to a predetermined relation with respect to the other indicator to cause the operation of the retarding means, and an electrically operated signal thrown into operation by the movement of the circuit controlling device to a position to secure the operation of the normaly inactive indicator.

12. A system of control for moving vehicles, comprising normally inactive means for retarding the movement of the vehicle, a normally inactive permissive speed indicator, a normally active actual speed indicator, electrically controlled means for controlling the movement of the normally inactive indicator, including a circuit controlling device, electrically operated means controlled by the movements of the permissive and actual speed indicators to a predetermined relation to effect the operation of the retarding means, an electrically operated signal, and electrical means for operating said signal including the said circuit controlling device, said device effecting the operation of the signal when it moves to a position to permit the operation of the permissive speed indicator.

13. A system of control for moving vehicles, comprising normally inactive means for retarding the movement of the vehicle, a normally inactive permissive speed indicator, means for effecting the movement of the speed indicator, a normally active actual speed indicator, mechanism for operating the retarding means when the permissive speed indicator and the actual speed indicator are moved to a predetermined relation, and a signal automatically thrown into operation when the movement of the permissive speed indicator is initiated.

14. A system of control for moving vehicles, comprising normally inactive means for retarding the movement of the vehicle, a normally inactive permissive speed indicator, means for effecting the movement of the speed indicator, a normally active actual speed indicator, mechanism for operating the retarding means when the permissive speed indicator and the actual speed indicator are moved to a predetermined relation, a signal, means for effecting the operation of the signal as long as the premissive speed indicator is inactive, and another signal automatically thrown into operation when the movement of the permissive speed indicator is initiated.

15. A system of control for moving vehicles, comprising normally inactive means for retarding the movement of the vehicle, a normally active actual speed indicator, a normally inactive permissive speed indicator, means for effecting the movement of the permissive speed indicator, electrical controlling mechanism for said means, including a circuit closer, mechanism for operating the retarding means when the permissive speed indicator and the actual speed indicator are moved to a predetermined relation, an electrical signal including a circuit held closed by the circuit closer as long as the permissive speed indicator is inactive, another electrical signal, and a circuit for the latter signal normally held open but closed by the circuit closer when the circuit of the first signal is opened.

16. A system of control for moving vehicles, comprising an actual speed indicator, a permissive speed indicator, means for effecting their relative movements, means for retarding the movement of the vehicle, electrical controlling mechanism for the retarding means, including a circuit closer operating with one of the indicators, and a device for actuating the circuit closer operating with the other indicator.

17. A system of control for moving vehicles, comprising an actual speed indicator, a permissive speed indicator, means for effecting their relative movements, means for retarding the movement of the vehicle, electrical controlling mechanism for the retarding means, including a circuit closer operating with one of the indicators and comprising elements relatively movable into and out of electrical contact, and a device for relatively moving the elements, said device operating with the other indicator.

18. A system of control for moving vehicles, comprising an actual speed indicator, a permissive speed indicator, means for effecting their relative movements, means for retarding the movement of the vehicles, electrical controlling mechanism for the retarding means, including a circuit closer operating with one of the indicators and comprising elements relatively movable into and out of electrical contact, and a device for relatively moving the elements out of electrical contact, said device operating with the other indicator.

19. A system of control for moving vehicles, comprising an actual speed indicator, a permissive speed indicator, means for effecting their relative movements, means for retarding the movement of the vehicle, electrical controlling mechanism for the retarding means including a circuit closer comprising relatively movable contact elements that are rotatable together and are thus moved by one of the indicators, and a device movable in the path of one of the contact elements and actuated by the other indicator.

20. A system of control for moving vehicles, comprising an actual speed indicator, a permissive speed indicator, means for effecting their relative movements, means for retarding the movement of the vehicle, electrical controlling mechanism for the retarding means, including a shaft, contact elements carried by the shaft, and rotatable together with the same, one of the elements being movable on the shaft into and out of engagement with the other element, means for rotating the shaft from one indicator, and means operated by the other indicator for causing the separation of the contact elements.

21. A system of control for moving vehicles, comprising means for retarding the movement of the vehicle, electrical controlling mechanism therefor, including a circuit closer, an actual speed indicator, and a device rotated by the speed indicator and arranged to engage the circuit closer to move the same.

22. A system of control for moving vehicles, comprising means for retarding the movement of the vehicle, electrical controlling mechanism therefor, including a circuit closer comprising separable contact elements, a rotatable actual speed indicator, and a device rotated thereby and operating in the path of one of the elements to move the same and thereby open the circuit when the said device assumes a predetermined position with respect to the circuit closer.

23. A system of control for moving vehicles, comprising means for retarding the movement of the vehicle, electrical controlling mechanism therefor, including a rotatable shaft, a circuit closer comprising relatively rotatable contact elements mounted on and movable with the shaft, yielding means for maintaining the elements in contact with each other, a normally stationary permissive speed indicator geared to the shaft, means for effecting the movement of said permissive speed indicator, a normally active actual speed indicator, and a device rotatable on the shaft and actuated by the actual speed indicator, said device being normally moved out of the path of one of the contact elements but moving in the said path and effecting the separation of said contact elements when the permissive speed indicator and the actual speed indicator reach a predetermined relation.

24. In apparatus of the character set forth, the combination with an actual speed indicator driven from the running gear of the vehicle, of means for indicating a normal permissive speed and a lower permissive speed under danger conditions, a signal for indicating danger conditions, means for actuating the signal and for effecting the change of the permissive speed indicator to the lower speed when danger conditions exist, traffic controlling means, and mechanism for effecting the operation of the traffic controlling means whenever the actual speed exceeds either the normal or the reduced permissive speed, said mechanism permitting the continued operation of the vehicle below either of said permissive speeds.

In testimony whereof I affix my signature in presence of two witnesses.

PAUL J. SIMMEN.

Witnesses:
S. A. PARCHMENT,
W. S. FISHER.